(12) United States Patent
Kwon et al.

(10) Patent No.: US 12,537,266 B2
(45) Date of Patent: Jan. 27, 2026

(54) ELECTROLYTE MEMBRANE FOR LITHIUM-AIR BATTERY, METHOD OF MANUFACTURING SAME AND LITHIUM-AIR BATTERY COMPRISING SAME

(71) Applicants: Hyundai Motor Company, Seoul (KR); Kia Corporation, Seoul (KR); Ulsan National Institute of Science and Technology, Ulsan (KR)

(72) Inventors: Eun Ji Kwon, Gyeonggi-do (KR); Samuel Seo, Gyeonggi-do (KR); Gwang Seok Oh, Gyeonggi-do (KR); Seok Ju Kang, Ulsan (KR); Kyung Eun Baek, Ulsan (KR)

(73) Assignees: Hyundai Motor Company, Seoul (KR); Kia Corporation, Seoul (KR); Ulsan National Institute of Science and Technology, Ulsan (KR)

( * ) Notice: Subject to any disclaimer, the term of this patent is extended or adjusted under 35 U.S.C. 154(b) by 0 days.

(21) Appl. No.: 18/420,078

(22) Filed: Jan. 23, 2024

(65) Prior Publication Data
US 2024/0162567 A1    May 16, 2024

Related U.S. Application Data

(62) Division of application No. 17/129,155, filed on Dec. 21, 2020, now Pat. No. 11,916,253.

(30) Foreign Application Priority Data

Jun. 2, 2020    (KR) .................. 10-2020-0066555

(51) Int. Cl.
*H01M 50/446*    (2021.01)
*H01M 4/38*    (2006.01)
(Continued)

(52) U.S. Cl.
CPC ......... *H01M 50/446* (2021.01); *H01M 4/382* (2013.01); *H01M 4/583* (2013.01); *H01M 12/08* (2013.01); *H01M 50/403* (2021.01)

(58) Field of Classification Search
None
See application file for complete search history.

(56) References Cited

U.S. PATENT DOCUMENTS 6,664,006 B1 * 12/2003 Munshi ................ H01M 4/13
429/234
9,133,383 B2    9/2015 Lazzari et al.
(Continued)

FOREIGN PATENT DOCUMENTS

CN    102124601 A    7/2011
CN    110010824 A    7/2019
(Continued)

OTHER PUBLICATIONS

The Cambridge Dictionary entry for "melt" accessed at https://dictionary.cambridge.org/US/dictionary/english/melt on Mar. 29, 2023 (copy provided in parent application) (Year: 2023).*
(Continued)

*Primary Examiner* — Amanda J Barrow
(74) *Attorney, Agent, or Firm* — Fox Rothschild LLP

(57) ABSTRACT

Disclosed are an electrolyte membrane for a lithium-air battery, a method of manufacturing the same, a cathode for a lithium-air battery, a method of manufacturing the same, and a lithium-air battery including the electrolyte membrane and the cathode. Particularly, the lithium-air battery includes i) an electrolyte membrane, which is manufactured using an inorganic melt admixture including two or more nitrogen-oxide compounds and thus may have a very low eutectic point, and ii) a cathode, which is manufactured by reducing a metal at a fast speed on a carbon material. As such, the
(Continued)

lithium-air battery is capable of stably operating even at low temperatures and providing high power output.

4 Claims, 12 Drawing Sheets

(51) Int. Cl.
   *H01M 4/583* (2010.01)
   *H01M 12/08* (2006.01)
   *H01M 50/403* (2021.01)

(56) References Cited

U.S. PATENT DOCUMENTS

| | | | |
|---|---|---|---|
| 2010/0203394 A1* | 8/2010 | Bae | H01M 50/489 429/246 |
| 2011/0136024 A1* | 6/2011 | Seymour | H01M 12/065 429/405 |
| 2012/0270114 A1 | 10/2012 | Reynolds et al. | |
| 2015/0024121 A1* | 1/2015 | He | H01M 50/403 429/188 |
| 2016/0028133 A1* | 1/2016 | Miles | H01M 12/02 429/405 |
| 2019/0051940 A1* | 2/2019 | Park | H01M 10/0569 |

FOREIGN PATENT DOCUMENTS

| | | |
|---|---|---|
| EP | 3 078 238 A1 | 10/2016 |
| JP | 2003272592 A | 9/2003 |
| JP | 2013157289 A | 8/2013 |
| JP | 2015-046342 A | 3/2015 |
| KR | 10-1014626 B1 | 2/2011 |
| KR | 10-2017-0037450 A | 4/2017 |
| KR | 20170067648 A | 6/2017 |
| WO | 2007/111988 A2 | 10/2007 |
| WO | WO 2007/111988 * 10/2007 | ............... H02J 7/00 |

OTHER PUBLICATIONS

Cheong et al., "Surface modified ceramic fiber separators for thermal batteries," Journal of Ceramic Processing Research, vol. 13, Special. 2, pp. s308-s311 (2012) (Year: 2012).*

Cambridge Dictionary entry for "melt", accessed at https://dictionary.cambridge.org/US/dictionary/english/melt on Mar. 29, 2023 (Year: 2023).

Baek, K., et al. "Synergistic effect of quinary molten salts and ruthenium catalyst for high-power-density lithium-carbon dioxide cell. Nat. Commun. 11, 456 (2020)." 2020, https://doi.org/10.1038/s41467-019-14121-1.

* cited by examiner

ELECTROLYTE MEMBRANE FOR LITHIUM-AIR BATTERY, METHOD OF MANUFACTURING SAME AND LITHIUM-AIR BATTERY COMPRISING SAME

CROSS REFERENCE TO RELATED APPLICATION

The present application is a Division of U.S. patent application Ser. No. 17/129,155, filed on Dec. 21, 2020, which claims priority based on Korean Patent Application No. 10-2020-0066555, filed on Jun. 2, 2020, the entire content of which is incorporated herein for all purposes by this reference.

TECHNICAL FIELD

The present invention relates to an electrolyte membrane for a lithium-air battery, a method of manufacturing the same, a cathode for a lithium-air battery, a method of manufacturing the same, and a lithium-air battery including the electrolyte membrane and the cathode. Particularly, the lithium-air battery may include i) an electrolyte membrane, which may be manufactured using an inorganic melt admixture (e.g., solution) including two or more nitrogen-oxide compounds and thus may have a very low eutectic point, and ii) a cathode, manufactured by reducing a metal at a fast speed on a carbon material. As such, the lithium-air battery is capable of stably operating even at low temperatures and providing high power output.

BACKGROUND

Lithium-air secondary batteries have greater energy density than lithium-ion secondary batteries and have the advantage of being able to operate using oxygen in the air. However, side reactions between the carbon-based electrode and the organic-solvent-based electrolyte may occur to deteriorate the performance of the batteries, and research into solving this problem has been ongoing.

An organic-solvent-based liquid electrolyte typically used in lithium-air secondary batteries is highly volatile, so it easily evaporates in the course of charging and discharging, undergoes loss due to leakage, and is unstable at high temperatures, making it difficult to operate.

SUMMARY

In one preferred aspect, provided is a lithium-air battery capable of operating under various temperature conditions ranging from low temperatures to high temperatures.

In one preferred aspect, provided is a method of manufacturing a cathode through a Joule heating reaction capable of synthesizing a catalyst in a short time.

The objectives of the present invention are not limited to the foregoing, and will be able to be clearly understood through the following description and to be realized by the means described in the claims and combinations thereof.

In an aspect, provided is a method of manufacturing an electrolyte membrane for a lithium-air battery. The method may include preparing an inorganic salt, preparing an inorganic melt admixture (e.g., solution) including the inorganic salt (e.g., by melting the inorganic salt), immersing a separator in the inorganic melt admixture, and drying the immersed separator.

The inorganic salt may include at least two nitrogen-oxide compounds.

The term "nitrogen-oxide compounds" as used herein refers to a compound or a salt that is formed with i) a cationic metal (e.g., alkali metal or alkali earth metal cation) and ii) an anionic nitrate ($NO_3^-$) or anionic nitrite ($NO_2^-$). Exemplary nitrogen-oxide compounds include the salt formed of the metal cation (e.g., $Li^+$, $Na^+$, $K^+$, $Rb^+$, $Cs^+$, $Mg^{2+}$, $Ca^{2+}$, $Sr^{2+}$, or $Ba^{2+}$) and the anionic nitrate ($NO_3^-$) or the anionic nitrite ($NO_2^-$).

The inorganic salt may include one or more selected from the group consisting of lithium nitrate ($LiNO_3$), potassium nitrate ($KNO_3$), potassium nitrite ($KNO_2$), cesium nitrate ($CsNO_3$), sodium nitrate ($NaNO_3$), and calcium nitrate ($Ca(NO_3)_2$).

The inorganic salt may include two types of nitrogen-oxide compounds, three types of nitrogen-oxide compounds, four types of nitrogen-oxide compounds, and five types of nitrogen-oxide compounds.

The two types of the nitrogen-oxide compounds may suitably include lithium nitrate and potassium nitrate, the three types of the nitrogen-oxide compounds may suitably include lithium nitrate, potassium nitrate and sodium nitrate, may include lithium nitrate, potassium nitrate and calcium nitrate, or may suitably include lithium nitrate, potassium nitrite and cesium nitrate, the four types of the nitrogen-oxide compounds may suitably include lithium nitrate, potassium nitrate, sodium nitrate and calcium nitrate, and the five types of the nitrogen-oxide compounds may suitably include lithium nitrate, potassium nitrate, cesium nitrate, sodium nitrate and calcium nitrate.

The inorganic salt may suitably include three types of the nitrogen-oxide compounds including lithium nitrate, potassium nitrite and cesium nitrate, four types of the nitrogen-oxide compounds including lithium nitrate, potassium nitrate, sodium nitrate and calcium nitrate, or five types of the nitrogen-oxide compounds including lithium nitrate, potassium nitrate, cesium nitrate, sodium nitrate and calcium nitrate.

The three types of the nitrogen-oxide compounds may include an amount of about 29 mol % to 35 mol % of lithium nitrate, an amount of about 51 mol % to 56 mol % of potassium nitrite and an amount of about 10 mol % to 15 mol % of cesium nitrate, the four types of the nitrogen-oxide compounds may include an amount of about 27 mol % to 31 mol % of lithium nitrate, an amount of about 38 mol % to 50 mol % of potassium nitrate, an amount of about 11 mol % to 20 mol % of sodium nitrate and an amount of about 10 mol % to 13 mol % of calcium nitrate, and the five types of the nitrogen-oxide compounds may include an amount of about 14 mol % to 17 mol % of lithium nitrate, an amount of about 29 mol % to 31 mol % of potassium nitrate, an amount of about 28 mol % to 32 mol % of cesium nitrate, an amount of about 9 mol % to 11 mol % of sodium nitrate and an amount of about 13 mol % to 18 mol % of calcium nitrate. All the mol % based on the total mole of the nitrogen-oxide compounds.

The inorganic salt may have a eutectic point of about 130° C. or less.

The inorganic salt may have a eutectic point of about 100° C. or less.

In an aspect, provided is an electrolyte membrane for a lithium-air battery manufactured by the method described herein.

In an aspect, provided is a method of manufacturing a cathode for a lithium-air battery. The method may include preparing a metal precursor admixture (e.g., solution)

including a metal precursor, manufacturing an electrode slurry including the metal precursor admixture and a carbon material, applying the electrode slurry on a substrate, and reducing a metal ion by applying current to the applied electrode slurry.

The metal precursor may include one or more selected from the group consisting of platinum (Pt), rubidium (Ru), palladium (Pd), rhodium (Rh), nickel (Ni), cobalt (Co), iron (Fe), copper (Cu), and silver (Ag).

The carbon material may include one or more selected from the group consisting of natural graphite, artificial graphite, carbon nanotubes, reduced graphene oxide (rGO), carbon fiber, carbon black, Ketjen black, acetylene black, mesoporous carbon, graphite, Denka black, fullerene, and activated carbon.

The electrode slurry may suitably include the metal precursor in an amount of about 40 parts by weight to 60 parts by weight based on 100 parts by weight of the carbon material.

The current may be applied for about 0.1 sec to 60 sec. The magnitude of the current may be about 6 A to 10 A.

In an aspect, provided is a cathode for a lithium-air battery manufactured by the method described above.

In an aspect, provided is a lithium-air battery that may include a cathode including a carbon material, an anode disposed to face the cathode and including a lithium metal that receives and releases a lithium ion, and the electrolyte membrane described herein interposed between the cathode and the anode.

The carbon material may include one or more selected from the group consisting of natural graphite, artificial graphite, carbon nanotubes, reduced graphene oxide (rGO), carbon fiber, carbon black, Ketjen black, acetylene black, mesoporous carbon, graphite, Denka black, fullerene, and activated carbon.

According to various exemplary embodiments of the present invention, a lithium-air battery capable of operating under various temperature conditions ranging from low temperatures to high temperatures may be provided.

According to various exemplary embodiments of the present invention, a method of manufacturing a cathode through a Joule heating reaction capable of synthesizing a catalyst in a short time may be provided.

The effects of the present invention are not limited to the foregoing, and should be understood to include all effects that can be reasonably anticipated from the following description.

Other aspects of the invention are disclosed infra.

DETAILED DESCRIPTION

Figure 1:
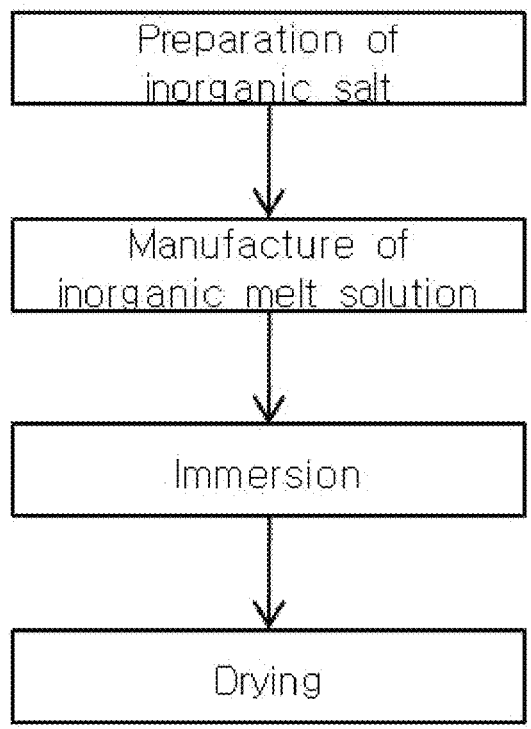
FIG. 1 shows an exemplary process of manufacturing an exemplary electrolyte membrane according to an exemplary embodiment of the present invention.

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present there between. Similarly, when an element such as a layer, film, area, or sheet is referred to as being "under" another element, it can be directly under the other element, or intervening elements may be present there between.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%%, 2%, 1%, 0.5%, 0.10%, 0.05%, or 0.01% of the stated value. Unless otherwise clear from the context, all numerical values provided herein are modified by the term "about."

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Provided herein are a method of manufacturing an electrolyte membrane for a lithium-air battery, an electrolyte membrane manufactured thereby, a method of manufacturing a cathode for a lithium-air battery, a cathode manufactured thereby, and a lithium-air battery including the electrolyte membrane and the cathode.

Figure 3:
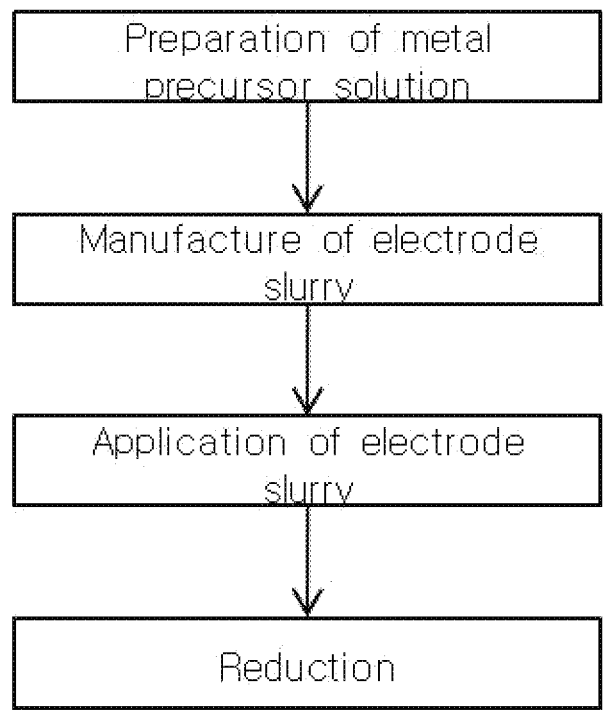
FIG. 3 shows an exemplary process of manufacturing an exemplary cathode according to an exemplary embodiment of the present invention.

FIGS. 1 and 3 are flowcharts showing exemplary processes of manufacturing the electrolyte membrane and the cathode according to exemplary embodiments of the present invention, respectively. With reference to these drawings, individual steps are specified below.

Method of Manufacturing Lithium-Air Battery

The method of manufacturing a lithium-air battery may include i) a method of manufacturing an electrolyte membrane and ii) a method of manufacturing a cathode.

The method of manufacturing the electrolyte membrane may include preparing an inorganic salt, preparing an inorganic melt admixture (e.g., solution) including the inorganic salt, by melting the inorganic salt, immersing a separator in the inorganic melt admixture, and drying the immersed separator. The method of manufacturing the cathode may include preparing a metal precursor admixture (e.g., solution) including a metal precursor, preparing an electrode slurry including mixing the metal precursor admixture and a carbon material, applying the electrode slurry on a substrate, and reducing a metal ion by applying current to the applied electrode slurry.

The method of manufacturing the electrolyte membrane and the method of manufacturing the cathode are separately described below.

Method of Manufacturing Electrolyte Membrane for Lithium-Air Battery

The method of manufacturing the electrolyte membrane for a lithium-air battery may include preparing an inorganic salt, preparing an inorganic melt admixture (e.g., solution) including the inorganic salt, for example, by melting the inorganic salt, immersing a separator in the inorganic melt admixture, and drying the immersed separator.

FIG. 1 shows an exemplary process of manufacturing an exemplary electrolyte membrane for a lithium-air battery according to an exemplary embodiment of the present invention. With reference thereto, individual steps are described, and the electrolyte membrane manufactured thereby is described with reference to FIG. 2.

Preparation of Inorganic Salt

An inorganic salt may be prepared, and the inorganic salt may preferably include a nitrogen-oxide compound.

The nitrogen-oxide compound may include one or more selected from the group consisting of lithium nitrate ($LiNO_3$), potassium nitrate ($KNO_3$), potassium nitrite ($KNO_2$), cesium nitrate ($CsNO_3$), sodium nitrate ($NaNO_3$), and calcium nitrate ($Ca(NO_3)_2$), and preferably includes two or more different nitrogen-oxide compounds.

The inorganic salt may include two types of the nitrogen-oxide compounds, three types of the nitrogen-oxide compounds, four types of the nitrogen-oxide compounds, and five types of the nitrogen-oxide compounds. Preferably, the inorganic salt may include three to five types of the nitrogen-oxide compounds.

The two types of the nitrogen-oxide compounds may suitably include lithium nitrate and potassium nitrate, the three types of the nitrogen-oxide compounds may suitably include lithium nitrate, potassium nitrate and sodium nitrate, include lithium nitrate, potassium nitrate and calcium nitrate, or include lithium nitrate, potassium nitrite and cesium nitrate, the four types of the nitrogen-oxide compounds may suitably include lithium nitrate, potassium nitrate, sodium nitrate and calcium nitrate, and the five types of the nitrogen-oxide compounds may suitably include lithium nitrate, potassium nitrate, cesium nitrate, sodium nitrate and calcium nitrate.

The two types of the nitrogen-oxide compounds may suitably include an amount of about 40 mol % to 43 mol % of lithium nitrate and an amount of about 57 mol % to 60 mol % of potassium nitrate. In the case in which the composition ratio thereof falls out of the above range, the area of the eutectic point in the phase equilibrium may be changed, which causes a problem in which the melting point is greatly changed, making it impossible to attain the desired effects of the present invention.

The three types of the nitrogen-oxide compounds may suitably include an amount of about 29 mol % to 31 mol % of lithium nitrate, an amount of about 51 mol % to 53 mol % of potassium nitrate and an amount of about 17 mol % to 19 mol % of sodium nitrate; suitably include an amount of about 30 mol % to 32 mol % of lithium nitrate, an amount of about 57 mol % to 59 mol % of potassium nitrate and an amount of about 10 mol % to 12 mol % of calcium nitrate; or suitably include an amount of about 29 mol % to 35 mol % of lithium nitrate, an amount of about 51 mol % to 56 mol % of potassium nitrite and an amount of about 10 mol % to 15 mol % of cesium nitrate.

The four types of the nitrogen-oxide compounds may suitably include an amount of about 27 mol % to 31 mol % of lithium nitrate, an amount of about 38 mol % to 50 mol % of potassium nitrate, an amount of about 11 mol % to 20 mol % of sodium nitrate and an amount of about 10 mol % to 13 mol % of calcium nitrate.

The five types of the nitrogen-oxide compounds may suitably include an amount of about 14 mol % to 17 mol % of lithium nitrate, an amount of about 29 mol % to 31 mol % of potassium nitrate, an amount of about 28 mol % to 32 mol % of cesium nitrate, an amount of about 9 mol % to 11 mol % of sodium nitrate and an amount of about 13 mol % to 18 mol % of calcium nitrate.

The eutectic point may vary depending on the type, number and amount of the nitrogen-oxide compounds included in the inorganic salt.

The eutectic point of the inorganic salt including two or more of the nitrogen-oxide compounds may be about 130° C. or less.

The eutectic point of the two types of the nitrogen-oxide compounds may preferably be about 125° C. or less, the eutectic point of the three types of the nitrogen-oxide compounds may preferably be about 90 to 120° C., the eutectic point of the four types of the nitrogen-oxide compounds may preferably be about 95° C. or less, and the eutectic point of the five types of the nitrogen-oxide compounds may preferably be about 80° C. or less.

The eutectic point of the inorganic salt may preferably be about 100° C. or less. The inorganic salt may include three types of the nitrogen-oxide compounds composed of lithium nitrate, potassium nitrite and cesium nitrate and having a eutectic point of about 90 to 95° C., four types of the nitrogen-oxide compounds composed of lithium nitrate, potassium nitrate, sodium nitrate and calcium nitrate and having a eutectic point of about 95° C. or less, or five types of the nitrogen-oxide compounds composed of lithium nitrate, potassium nitrate, cesium nitrate, sodium nitrate and calcium nitrate and having a eutectic point of about 80° C. or less.

Manufacture of Inorganic Melt Admixture

The inorganic salt may be melted to afford an inorganic melt admixture. For example, the inorganic salt including two or more nitrogen-oxide compounds may be melted to afford an inorganic melt admixture. The composition of the nitrogen-oxide compounds included in the inorganic melt admixture is the same as the composition of the nitrates included in the inorganic salt.

Immersion

A separator may be immersed in the inorganic melt admixture prepared above, so the separator may be wetted with the inorganic melt admixture and thus the inorganic melt admixture may be incorporated into and attached to the inner and outer portions of the separator.

Any separator may be used without limitation, so long as it is typically useful in fuel cell fields and is resistant to temperatures of about 110° C. or greater, and about preferably 130° C. or greater. Since the separator is impregnated with the inorganic melt admixture obtained through melting at a high temperature, it has to possess sufficient heat resistance to withstand the heat of the inorganic melt admixture. The separator may preferably include glass fiber.

Drying

The separator may be taken out of the inorganic melt admixture and dried to afford an electrolyte membrane.

The drying may be preferably performed at a temperature of about 60° C. or less in a vacuum, and the drying process in the present invention is not particularly limited.

Electrolyte Membrane for Lithium-Air Battery

The electrolyte membrane for a lithium-air battery may be manufactured through the method described herein, and the electrolyte membrane may include a separator and an inorganic melt admixture. The inorganic melt admixture may suitably include two to five types of the nitrogen-oxide compounds, and preferably include three to five types of the nitrogen-oxide compounds.

Figure 2:
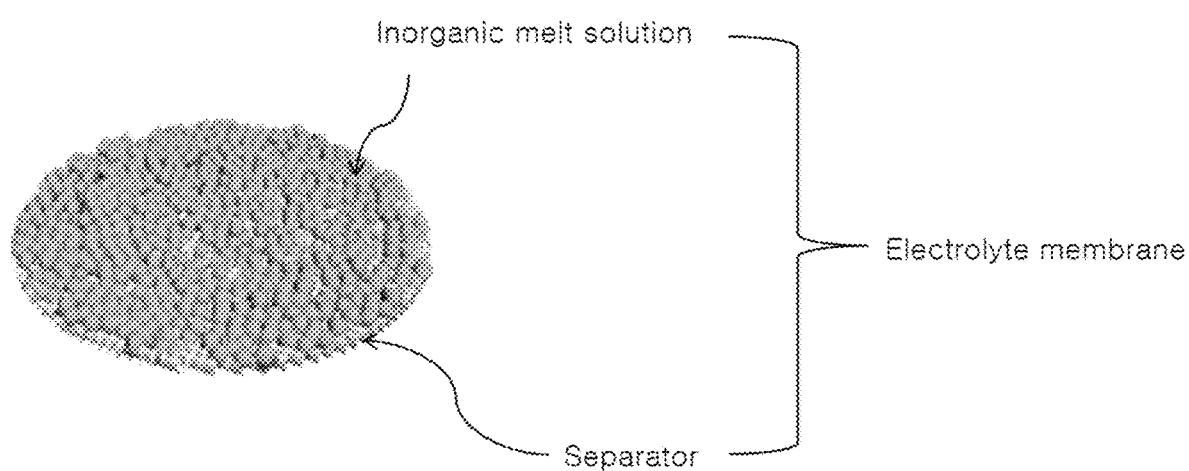
FIG. 2 shows an exemplary configuration of an exemplary electrolyte membrane according to an exemplary embodiment of the present invention.

FIG. 2 shows an exemplary electrolyte membrane for a lithium-air battery according to an exemplary embodiments of the present invention. For example, the inorganic melt admixture may be incorporated into and attached to the inner and outer portions of the separator having pores therein.

Method of Manufacturing Cathode for Lithium-Air Battery

The method of manufacturing the cathode for a lithium-air battery may include preparing a metal precursor admixture (e.g., solution) including a metal ion, preparing an electrode slurry including the metal precursor admixture and a carbon material, applying the electrode slurry on a substrate, and reducing the metal ion by applying current to the applied electrode slurry.

FIG. 3 is a flowchart of an exemplary process of manufacturing an exemplary cathode according to an exemplary embodiment of the present invention. With reference thereto, individual steps are described, and the cathode manufactured thereby is described with reference to FIG. 4.

Preparation of Metal Precursor Admixture

A metal precursor admixture including a metal ion may be prepared. The metal precursor admixture may include a metal precursor.

The metal precursor may suitably include one or more metal selected from the group consisting of platinum (Pt), rubidium (Ru), palladium (Pd), rhodium (Rh), nickel (Ni), cobalt (Co), iron (Fe), copper (Cu), and silver (Ag).

The metal precursor is not particularly limited, so long as it is capable of being coupled with the above metal and of being dissolved in water ($H_2O$). For example, the metal precursor includes a form in which nitrate ($NO_3^-$), nitrite ($NO_2^-$), chloride ($Cl^-$), or the like is coupled with the metal. For example, the metal may be present in an ionic state by being coupled with the anion, such as nitrate, nitrite or chloride.

Manufacture of Electrode Slurry

The metal precursor admixture may be mixed with a carbon material to afford an electrode slurry.

The carbon material may suitably include one or more selected from the group consisting of natural graphite, artificial graphite, carbon nanotubes, reduced graphene oxide (rGO), carbon fiber, carbon black, Ketjen black, acetylene black, mesoporous carbon, graphite, Denka black, fullerene, and activated carbon.

The metal precursor of the present invention may preferably be mixed in an amount of 40 parts by weight to 60 parts by weight based on 100 parts by weight of the carbon material.

Application of Electrode Slurry

The electrode slurry may be applied on a substrate.

The type of substrate is not particularly limited in the present invention, and any substrate may be used, so long as it provides a base on which it is possible to uniformly apply the electrode slurry and is conductive.

The process of applying the electrode slurry is not particularly limited, and any process may be performed in the present invention, so long as it is typically able to apply an electrode slurry.

Reduction

The current may be applied to the applied electrode slurry and thus the metal ion may be reduced. Particularly, a metal catalyst may be synthesized on the surface of the carbon material through a Joule heating reaction.

The current may be applied to both ends of the electrode slurry, which may be applied and uniformly spread on the substrate. The magnitude of the current that is applied may preferably be about 6 A to 10 A for about 0.1 see to 60 sec.

Cathode for Lithium-Air Battery

A cathode for a lithium-air battery according to the present invention may be manufactured through the method described herein, and the cathode may include a carbon material and a metal attached to the surface of the carbon material. The metal may suitably include one or more selected from the group consisting of platinum (Pt), rubidium (Ru), palladium (Pd), rhodium (Rh), nickel (Ni), cobalt (Co), iron (Fe), copper (Cu), and silver (Ag).

Figure 4:
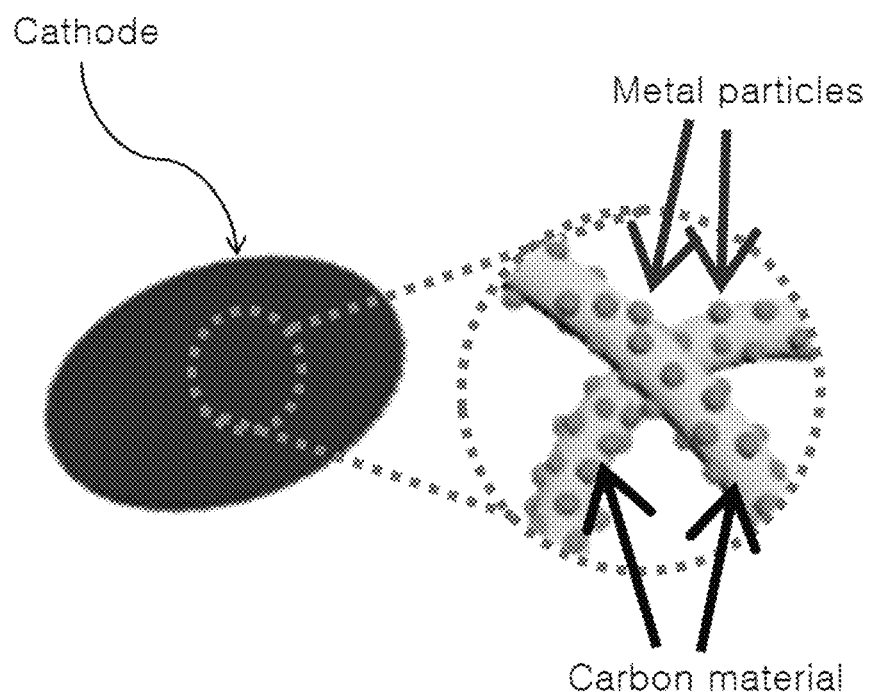
FIG. 4 shows an exemplary configuration of an exemplary cathode according to an exemplary embodiment of the present invention.

FIG. 4 shows an exemplary cathode for a lithium-air battery according to an exemplary embodiment of the present invention. With reference thereto, the metal ion is reduced and precipitated as metal particles on the surface of the carbon material forming the cathode skeleton.

Lithium-Air Battery

A lithium-air battery includes a cathode including a carbon material, an anode disposed to face the cathode and including a lithium metal that receives and releases a lithium ion, and an electrolyte membrane interposed between the cathode and the anode.

The carbon material included in the cathode may suitably include one or more selected from the group consisting of natural graphite, artificial graphite, carbon nanotubes, reduced graphene oxide (rGO), carbon fiber, carbon black, Ketjen black, acetylene black, mesoporous carbon, graphite, Denka black, fullerene, and activated carbon.

The cathode of the present invention may include a carbon material having metal particles on the surface thereof.

The metal particles may be obtained as being precipitated by reducing the metal ion on the surface of the carbon material by the current applied from the outside, and may include one or more selected from the group consisting of platinum (Pt), rubidium (Ru), palladium (Pd), rhodium (Rh), nickel (Ni), cobalt (Co), iron (Fe), copper (Cu), and silver (Ag).

The anode is not limited, so long as it is of a type that is typically useful for a lithium-air battery.

The electrolyte membrane may include a separator and an inorganic melt admixture. The inorganic melt admixture may include two to five types of the nitrogen-oxide compounds, and preferably three to five types of the nitrogen-oxide compounds described herein.

EXAMPLE

A better understanding of the present invention will be given through the following examples. However, these examples are merely set forth to illustrate the present invention, and are not to be construed as limiting the scope of the present invention.

Preparation Example 1 and Preparation Example 2

An inorganic salt including a combination of nitrates as shown in Table 1 below was prepared, and was then melted to afford an inorganic melt admixture. Thereafter, a glass fiber film was immersed in the inorganic melt admixture and was then slowly dried at room temperature, thus manufacturing an electrolyte membrane.

TABLE 1

| nitrogen-oxide compounds | $LiNO_3$ (mol %) | $KNO_3$ (mol %) | $CsNO_3$ (mol %) | $NaNO_3$ (mol %) | $Ca(NO_3)_2$ (mol %) |
|---|---|---|---|---|---|
| Preparation Example 1 | 43 | 57 | — | — | — |
| Preparation Example 2 | 15 | 30 | 29 | 10 | 16 |

Preparation Example 3

A carbon paper (P50) including a carbon material (Super P) was prepared, and a metal precursor solution, $RuCl_3 \cdot H_2O$, was mixed in an amount of 50 parts by weight based on 100 parts by weight of the carbon material to afford an electrode slurry. The electrode slurry was applied on the carbon paper using a doctor blade. Thereafter, both ends of the carbon paper and the electrode slurry applied on the carbon paper were connected with a copper foil through which external current was made to flow, after which current of 7 A was applied thereto and the temperature of the electrode slurry was elevated, thereby manufacturing a cathode.

Preparation Example 4

An anode including lithium metal foil and a cathode were joined to respective sides of the electrolyte membrane manufactured in Preparation Example 1, thus manufacturing a lithium-air battery. Here, the cathode was a carbon paper coated with $RuO_2$ and PVDF (polyvinylidene fluoride).

Preparation Example 5

An anode including lithium metal foil and a cathode were joined to respective sides of the electrolyte membrane manufactured in Preparation Example 2, thus manufacturing a lithium-air battery. Here, the cathode was a carbon paper coated with $RuO_2$ and PVDF (polyvinylidene fluoride).

Preparation Example 6

An anode including lithium metal foil and the cathode manufactured in Preparation Example 3 were joined to respective sides of the electrolyte membrane manufactured in Preparation Example 1, thus manufacturing a lithium-air battery.

Preparation Example 7

An anode including lithium metal foil and the cathode manufactured in Preparation Example 3 were joined to respective sides of the electrolyte membrane manufactured in Preparation Example 2, thus manufacturing a lithium-air battery.

Test Example 1

Figure 5A:
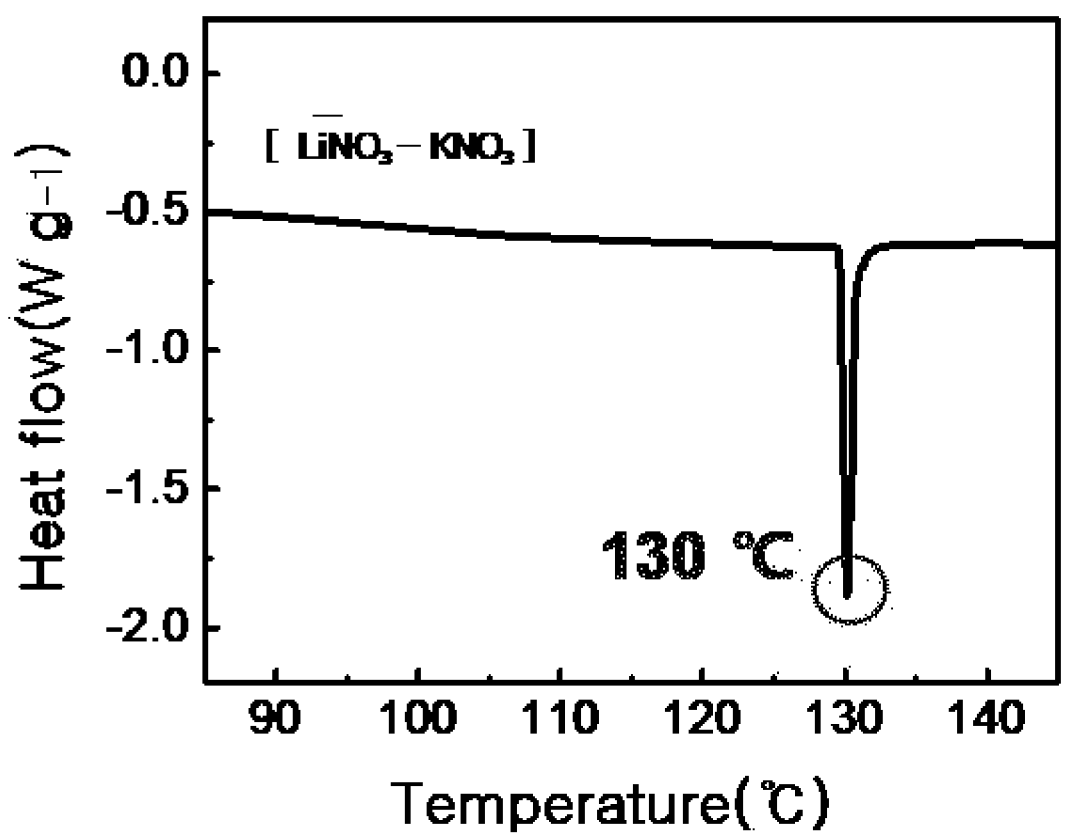
FIGS. 5A and 5B are graphs showing the results of Test Example 1.
Figure 5B:
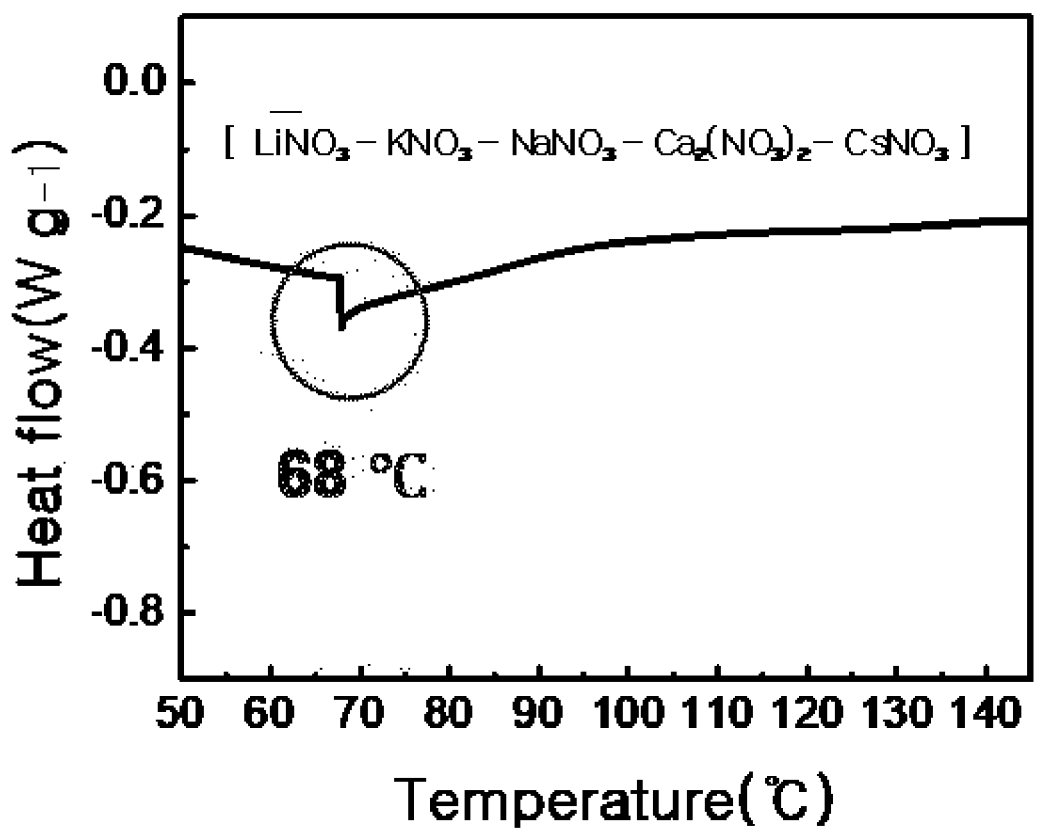

The melting point of the electrolyte membrane manufactured in each of Preparation Example 1 and Preparation Example 2 was measured using differential scanning calorimetry (DSC). As shown in FIGS. 5A and 5B, showing the results thereof, the eutectic point was 130° C. in Preparation Example 1 (FIG. 5A) using the inorganic salt including two types of salts, and was 68° C. in Preparation Example 2 (FIG. 5B) using the inorganic salt including five types of salts.

Test Example 2

Figure 6A:
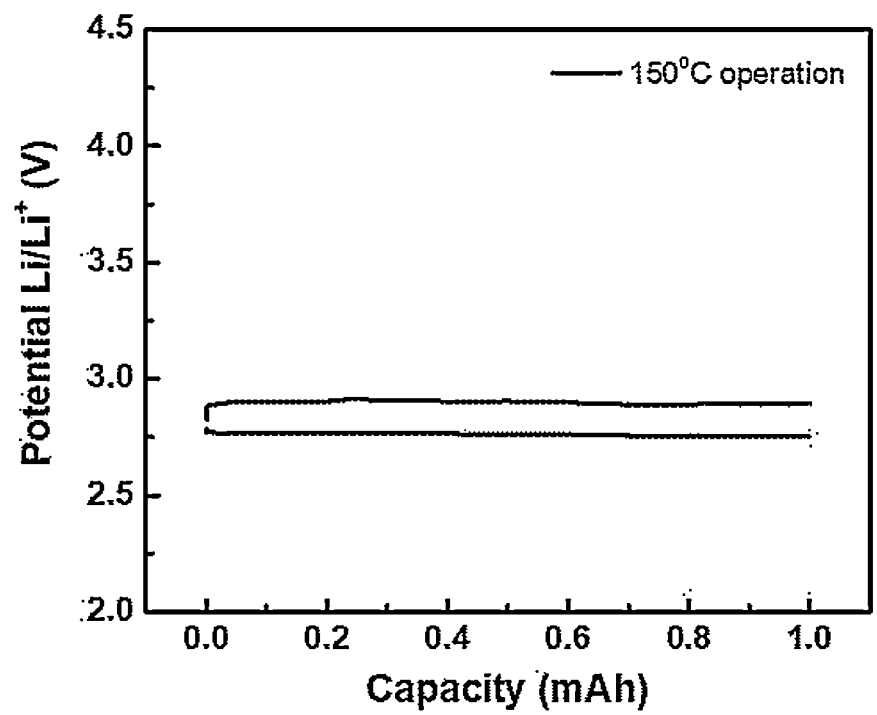
FIGS. 6A and 6B are graphs showing the results of Test Example 2.
Figure 6B:
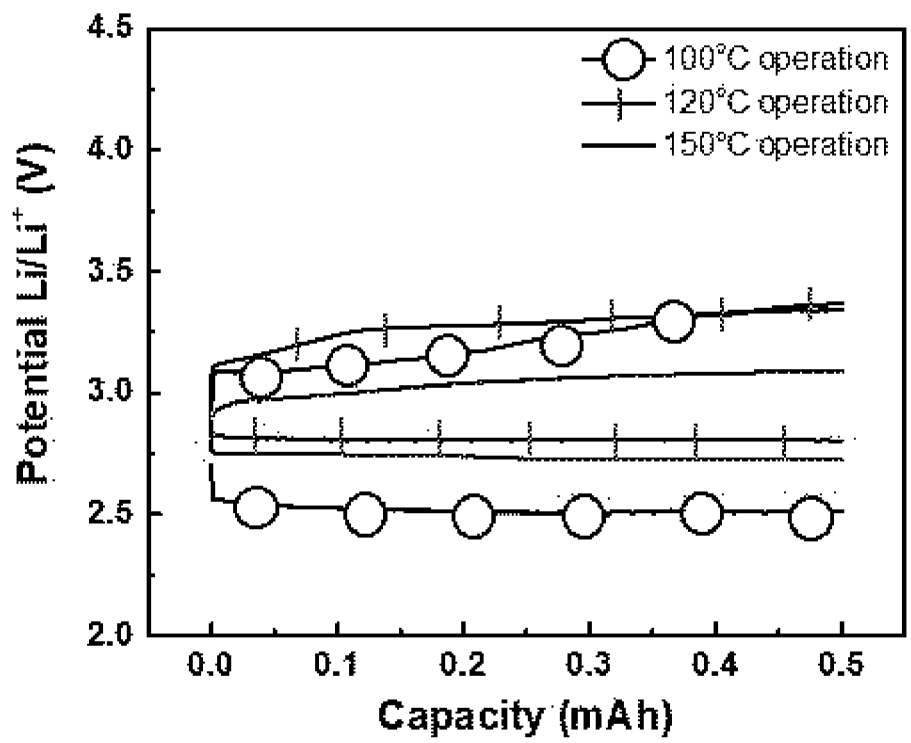

The lithium-air batteries manufactured in Preparation Example 4 and Preparation Example 5 were charged and discharged at 100° C., 120° C. and 150° C. The results thereof are shown in FIGS. 6A and 6B. Particularly, FIG. 6A is a graph showing the voltage depending on capacity measured during charge and discharge of the lithium-air battery including the electrolyte membrane manufactured using the inorganic salt including two types of salts, and FIG. 6B is a graph showing the voltage depending on capacity measured during charge and discharge of the lithium-air battery including the electrolyte membrane manufactured using the inorganic salt including five types of salts.

As shown in the graph of FIG. 6B, the charge/discharge voltage difference greatly decreased with an increase in the operating temperature.

Test Example 3

Figure 7A:
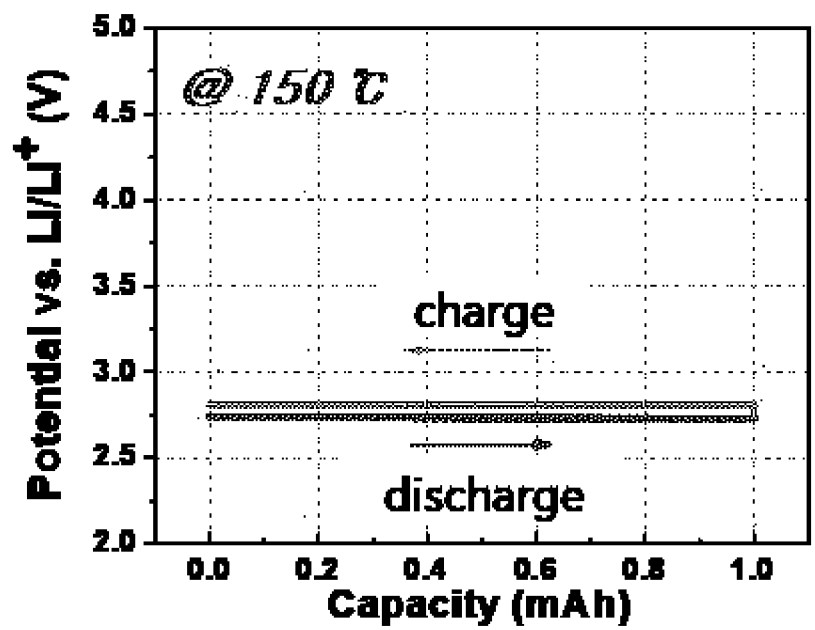
FIGS. 7A to 7F are graphs showing the results of Test Example 3.
Figure 7B:
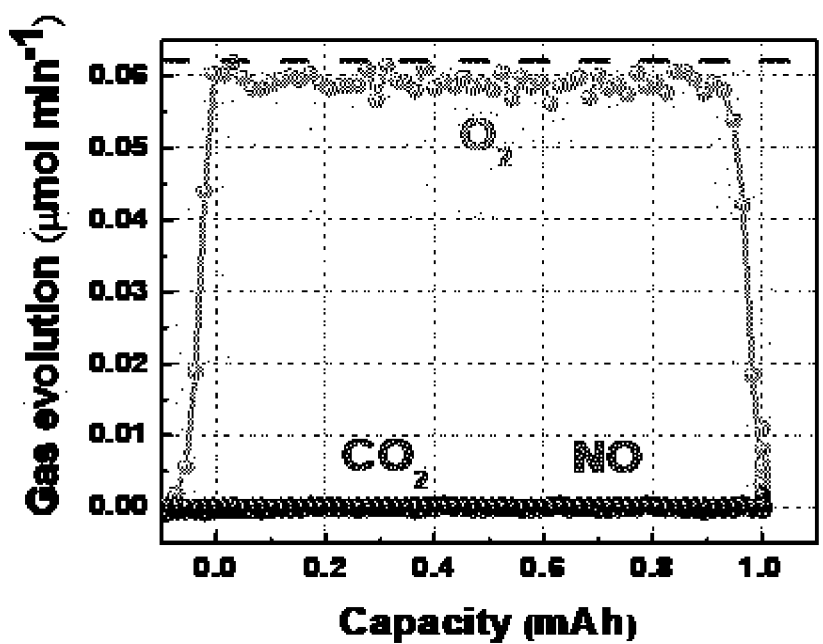
Figure 7C:
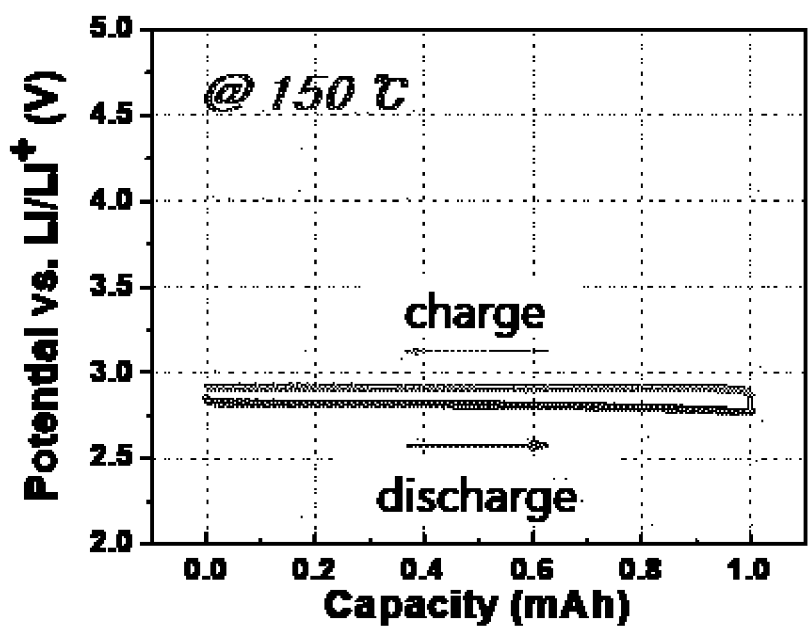
Figure 7D:
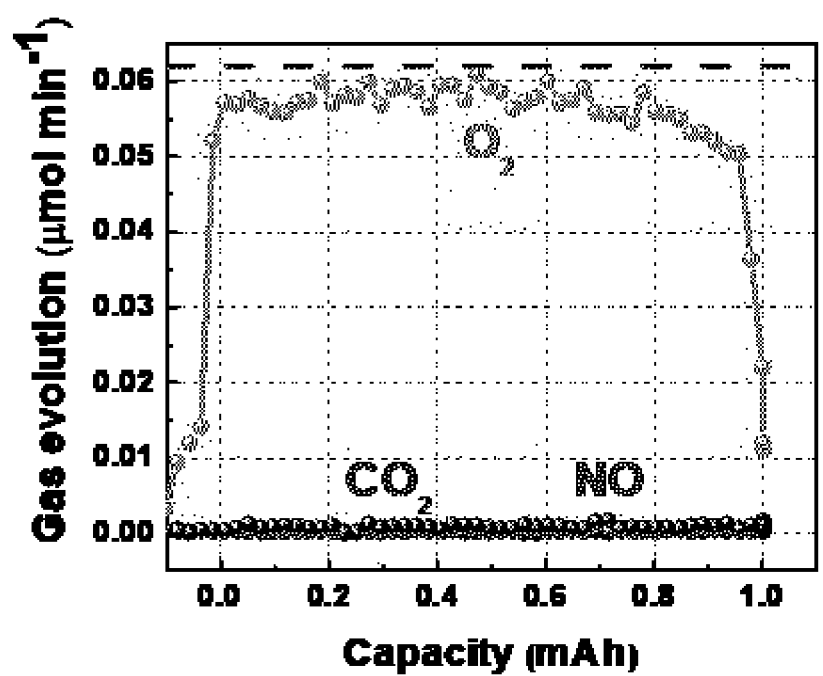
Figure 7E:
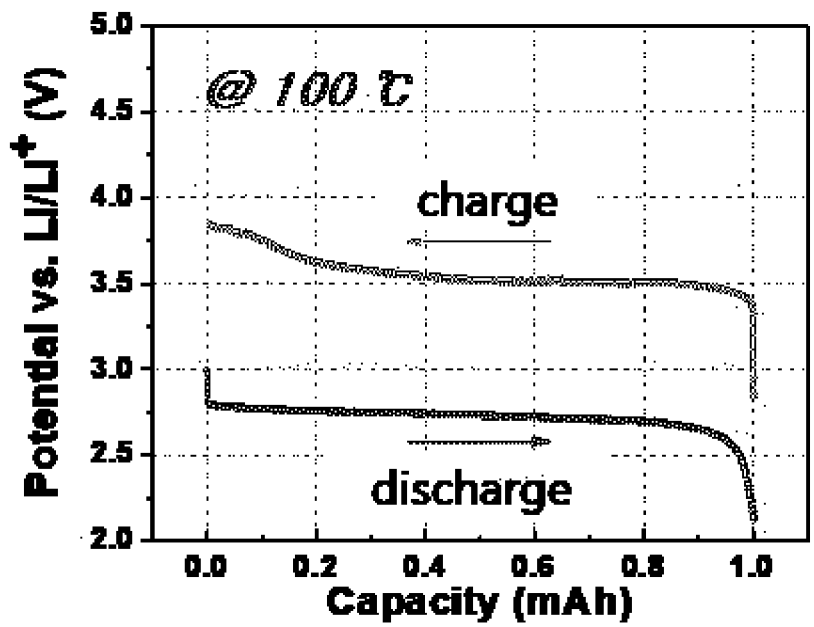
Figure 7F:
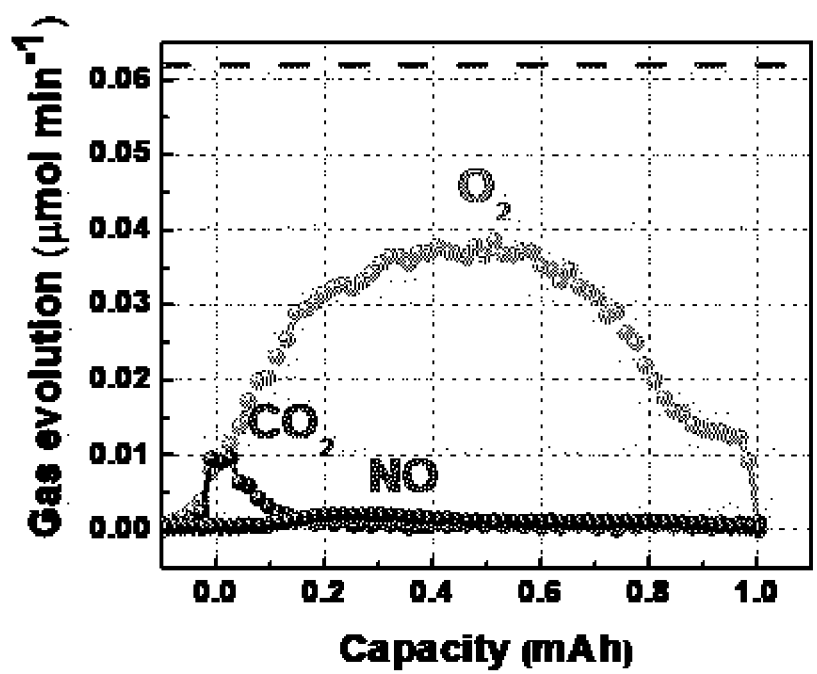

The charge/discharge test was performed on the lithium-air battery of Preparation Example 5, and the gas evolution was measured at the same time. The results thereof are shown in FIGS. 7A to 7F. Particularly, FIG. 7A shows a change in voltage when charging and discharging the lithium-air battery of Preparation Example 4 at an operating temperature of 150° C., FIG. 7C shows a change in voltage when charging and discharging the lithium-air battery of Preparation Example 5 at an operating temperature of 150° C., and FIG. 7E shows a change in voltage when charging and discharging the lithium-air battery of Preparation Example 5 at an operating temperature of 100° C. Particularly, FIGS. 7A, 7C and 7E show the change in voltage depending on capacity when charging and discharging the lithium-air battery at respective operating temperatures. The results of gas evolution during respective tests at the same time are shown in order in FIGS. 7B, 7D and 7F.

Based on the results of FIGS. 7A to 7F, in both of the inorganic salt including two types of salts (nitrogen-oxide compounds) and the inorganic salt including five types of salts (nitrogen-oxide compounds) at the operating temperature of 150° C., oxygen reached the theoretical value, but when the operating temperature was low, specifically 100° C., the oxygen evolution was slightly decreased.

Test Example 4

Figure 8A:
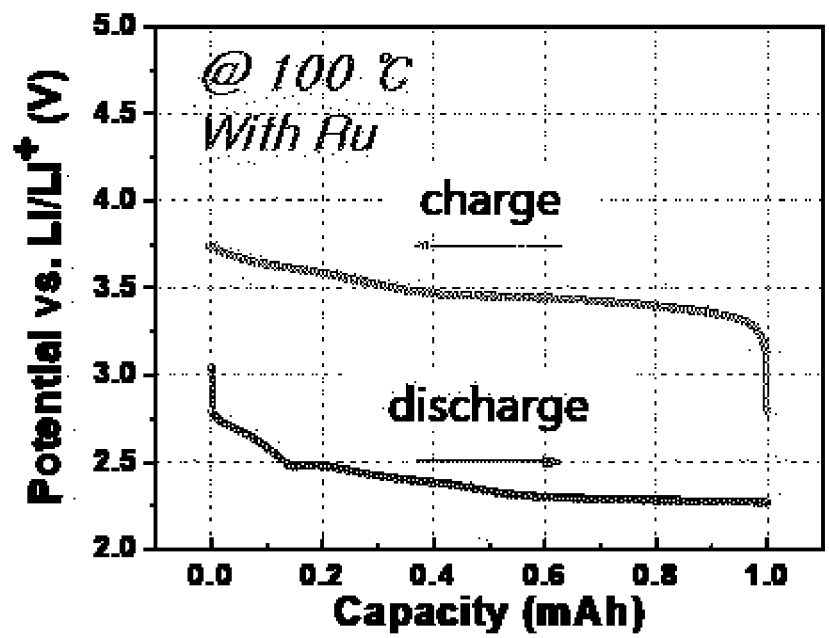
FIGS. 8A and 8B are graphs showing the results of Test Example 4.
Figure 8B:
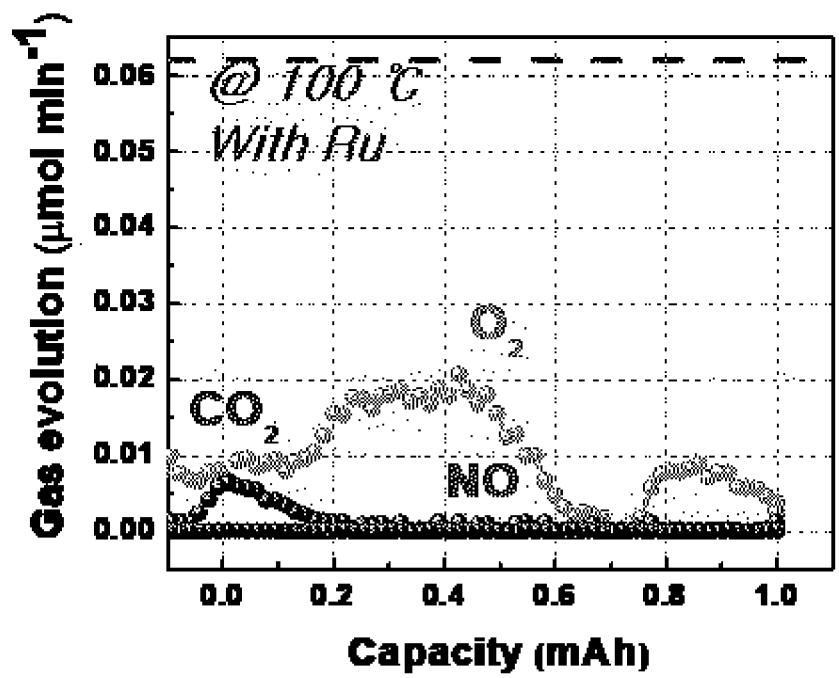

The lithium-air battery of Preparation Example 7 was charged and discharged and analyzed for gas evolution in the same manner as in Test Example 3. The results thereof are shown in FIGS. 8A and 8B. Particularly, FIG. 8A is a graph showing the voltage that appears when applying a current at an operating temperature of 100° C. depending on the capacity, and FIG. 8B is a graph showing the results of measurement of gas evolution at the same time.

Test Example 5

Figure 9A:
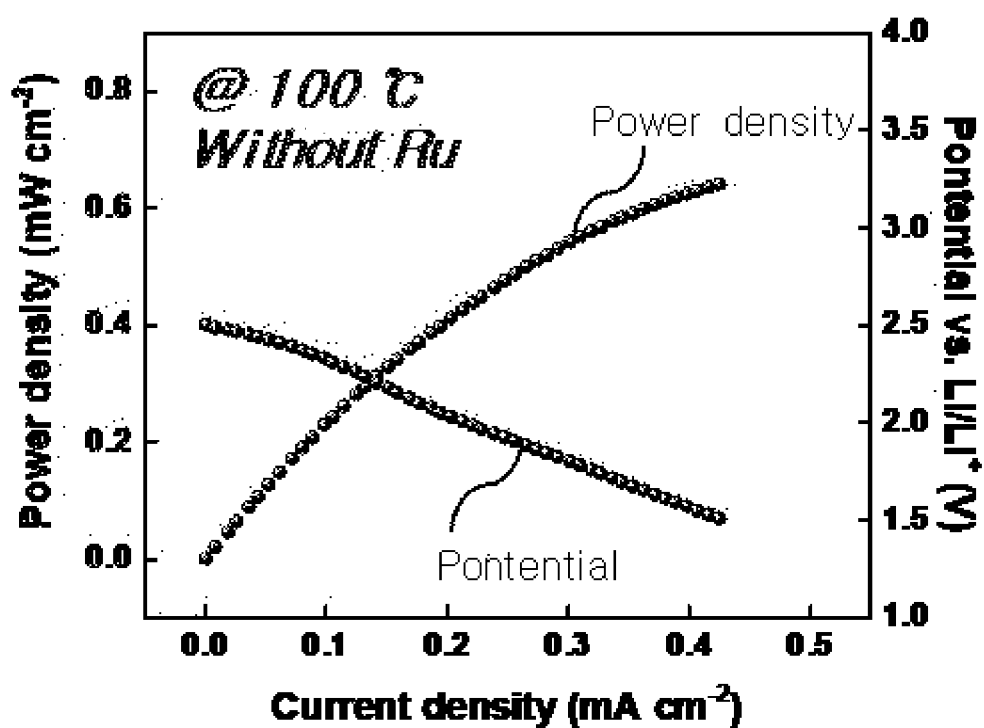
FIGS. 9A and 9B are graphs showing the results of Test Example 5.
Figure 9B:
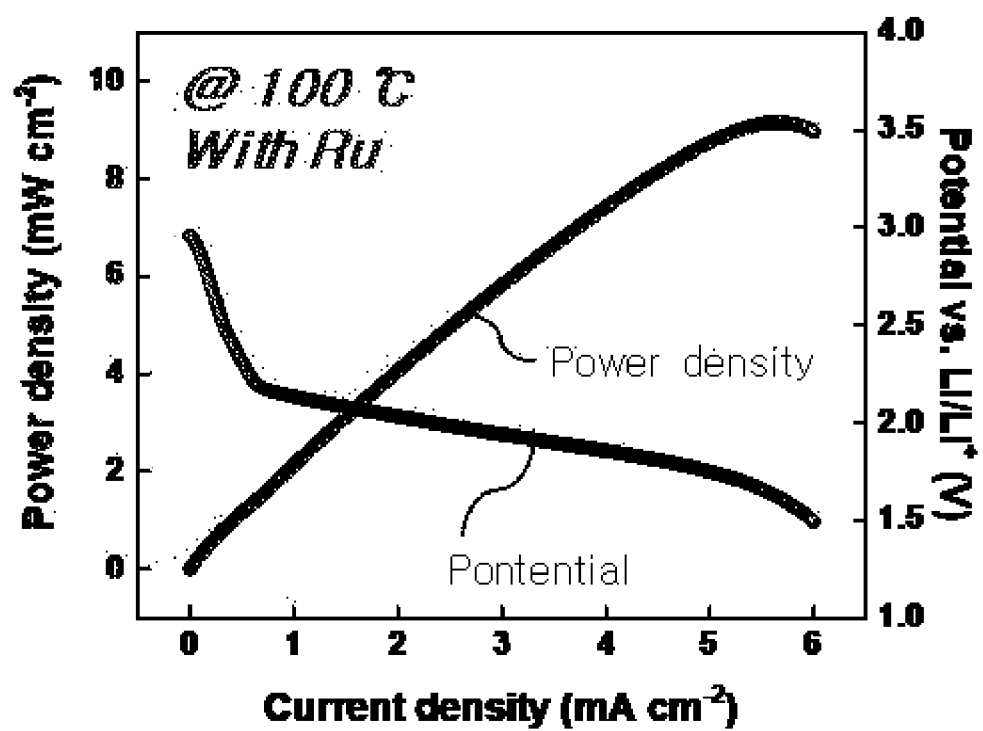

For the lithium-air battery of Preparation Example 5 and the lithium-air battery of Preparation Example 7, the voltage and power density were measured by applying current of 0.01 mA/s at a temperature of 100° C. The results thereof are shown in FIGS. 9A and 9B. With reference to FIGS. 9A and 9B, the power density was increased 10 times or more when using the cathode of Preparation Example 3 (the results of measurement of the lithium-air battery of Preparation Example 5 are shown in FIG. 9A and the results of measurement of the lithium-air battery of Preparation Example 7 are shown in FIG. 9B).

Test Example 6

Figure 10A:
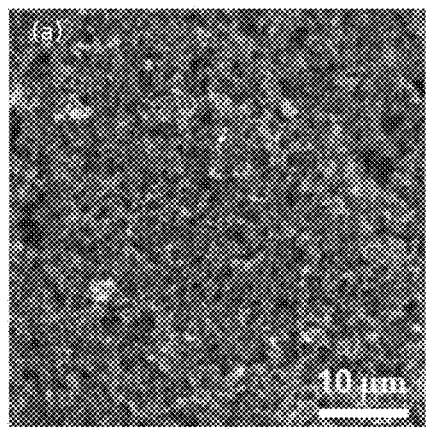
FIGS. 10A to 10C are SEM images showing the cathode of the present invention in Test Example 6.
Figure 10B:
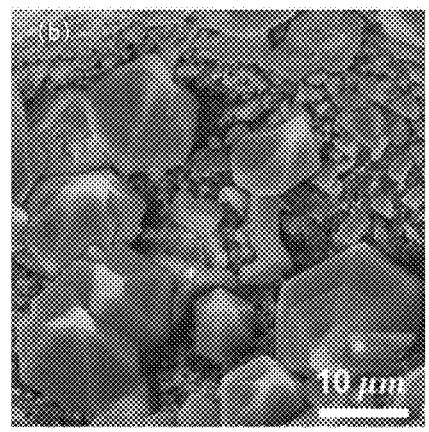
Figure 10C:
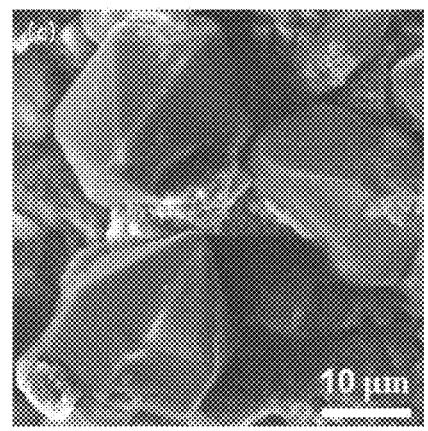

For the lithium-air batteries of Preparation Example 6 and Preparation Example 7, the surface of the cathode was observed before and after discharge using a scanning electron microscope (SEM). The results thereof are shown in FIGS. 10A to 10C. FIG. 10A shows the surface of the cathode before discharge of the lithium-air battery of Preparation Example 6, and FIG. 10B shows the surface of the cathode after discharge of the lithium-air battery of Preparation Example 6 at a temperature of 150° C. FIG. 10C shows the surface of the cathode after discharge of the lithium-air battery of Preparation Example 7 at a temperature of 100° C. As shown in the SEM images, it was confirmed that the operating temperature was different but the same discharge product was generated after discharge.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electrolyte membrane for a lithium-air battery manufactured by a method, wherein the method comprises:
    preparing an inorganic salt;
    preparing an inorganic melt admixture by melting the inorganic salt;
    immersing a separator in the inorganic melt admixture; and
    drying the immersed separator,
    wherein the separator has pores therein, and the inorganic melt admixture is incorporated into and attached to inner and outer portions of the separator,
    wherein the inorganic salt comprises:
    three types of the nitrogen-oxide compounds, four types of the nitrogen-oxide compounds, or five types of the nitrogen-oxide compounds,
    wherein the three types of the nitrogen-oxide compounds comprise an amount of about 29 mol % to 35 mol % of lithium nitrate, an amount of about 51 mol % to 56 mol % of potassium nitrite and an amount of about 10 mol % to 15 mol % of cesium nitrate,
    the four types of the nitrogen-oxide compounds comprise an amount of about 27 mol % to 31 mol % of lithium nitrate, an amount of about 38 mol % to 50 mol % of potassium nitrate, an amount of about 11 mol % to 20 mol % of sodium nitrate and an amount of about 10 mol % to 13 mol % of calcium nitrate, and
    the five types of the nitrogen-oxide compounds comprise an amount of about 14 mol % to 17 mol % of lithium nitrate, an amount of about 29 mol % to 31 mol % of potassium nitrate, an amount of about 28 mol % to 32 mol % of cesium nitrate, an amount of about 9 mol % to 11 mol % of sodium nitrate and an amount of about 13 mol % to 18 mol % of calcium nitrate,
    all the mol % based on the total mole of the nitrogen-oxide compounds,
    wherein the inorganic salt has a eutectic point of about 100° C. or less.

2. A lithium-air battery, comprising:
    a cathode comprising a carbon material;
    an anode disposed to face the cathode and comprising a lithium metal that receives and releases a lithium ion; and
    the electrolyte membrane of claim 1, interposed between the cathode and anode.

3. The lithium-air battery of claim 2, wherein the carbon material comprises one or more selected from the group consisting of natural graphite, artificial graphite, carbon nanotubes, reduced graphene oxide (rGO), carbon fiber, carbon black, Ketjen black, acetylene black, mesoporous carbon, graphite, Denka black, fullerene, and activated carbon.

4. The electrolyte membrane for a lithium-air battery of claim 1, wherein the inorganic salt comprises the five types of the nitrogen-oxide compounds, and
    wherein the five types of the nitrogen-oxide compounds comprise an amount of about 14 mol % to 17 mol % of lithium nitrate, an amount of about 29 mol % to 31 mol % of potassium nitrate, an amount of about 28 mol % to 32 mol % of cesium nitrate, an amount of about 9 mol % to 11 mol % of sodium nitrate and an amount of about 13 mol % to 18 mol % of calcium nitrate.

\* \* \* \* \*